(12) United States Patent
Ashida (10) Patent No.: US 8,670,658 B2
(45) Date of Patent: Mar. 11, 2014

(54) IMAGE CAPTURE APPARATUS AND METHOD OF CONTROLLING THE SAME

(75) Inventor: Yuuichirou Ashida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/473,298

(22) Filed: May 16, 2012

(65) Prior Publication Data

US 2012/0301125 A1   Nov. 29, 2012

(30) Foreign Application Priority Data

May 27, 2011   (JP) .................................. 2011-119711

(51) Int. Cl.
*G03B 3/10*   (2006.01)
*G03B 13/34*   (2006.01)
*G03B 15/16*   (2006.01)
*G03B 39/00*   (2006.01)

(52) U.S. Cl.
USPC .......................................................... 396/95

(58) Field of Classification Search
USPC .......... 396/61, 95, 103; 348/169–172, 208.14
See application file for complete search history.

(56) References Cited

U.S. PATENT DOCUMENTS

| 6,437,819 B1* | 8/2002 | Loveland | 348/143 |
| 2010/0166261 A1* | 7/2010 | Tsuji | 382/103 |
| 2011/0150280 A1* | 6/2011 | Tsuji | 382/103 |
| 2012/0165964 A1* | 6/2012 | Flaks et al. | 700/94 |
| 2012/0243737 A1* | 9/2012 | Ogawa | 382/103 |

FOREIGN PATENT DOCUMENTS

| JP | 2003-255429 | 9/2003 |
| JP | 2010-072283 | 4/2010 |

* cited by examiner

*Primary Examiner* — Clayton E LaBalle
*Assistant Examiner* — Warren K Fenwick
(74) *Attorney, Agent, or Firm* — Cowan, Liebowitz & Latman, P.C.

(57) ABSTRACT

A subject is tracked during continuous shooting, and the degree of reliability of the tracking result is determined. When it is determined that the degree of reliability of the tracking result is high, control values of exposure used to capture an image of the previous frame are configured as those used to capture an image of the next frame, thereby omitting calculation of control values of exposure. Upon this operation, in an image capture apparatus having a continuous shooting function, and a method of controlling the same, suppression of exposure variations and shortening of the exposure calculation time during continuous shooting can be effectively achieved.

6 Claims, 11 Drawing Sheets

| DEGREE OF RELIABILITY OF SUBJECT TRACKING RESULT | CORRELATION VALUE OF LUMINANCE SIGNAL | CORRELATION VALUE OF COLOR SIGNAL |
|---|---|---|
| HIGH | ≥ THRESHOLD VALUE | ≥ THRESHOLD VALUE |
| MIDDLE | ONE OF CORRELATION VALUES ≥ THRESHOLD VALUE | |
| LOW | < THRESHOLD VALUE | < THRESHOLD VALUE |

EXPOSURE CALCULATION WEIGHTING RANGE

EXPOSURE CALCULATION WEIGHTING RANGE

FIG. 8A

MAIN SUBJECT

EXPOSURE CALCULATION WEIGHTING RANGE

IMAGE CAPTURE APPARATUS AND METHOD OF CONTROLLING THE SAME

BACKGROUND OF THE INVENTION

1. Field of the Invention

The present invention relates to an image capture apparatus and a method of controlling the same and, more particularly, to an image capture apparatus having a continuous shooting function and a method of controlling the same.

2. Description of the Related Art

In recent years, a variety of image capture apparatuses capable of continuously performing focus adjustment of an imaging lens for a moving subject have been commercialized, so various methods for achieving continuous focus adjustment have been proposed. Examples of these methods include a method of performing continuous focus adjustment using signals not only from a focus detection area adjusted for the subject by the user but also from other focus detection areas among a plurality of focus detection areas (a method which increases the focus detection area), and a method of detecting (tracking) a motion of the subject by a subject recognition technique and performing focus adjustment at the position to which the subject has moved.

A digital still camera (to be simply referred to as a camera hereinafter) generally has a single-shooting mode and a continuous shooting mode, and often captures a subject which makes various motions in the continuous shooting mode. Also, a variety of conventional cameras perform metering, exposure calculation, focus detection, and focus adjustment of imaging lenses for each frame in consideration of changes in luminance and movement of the subject during continuous shooting. The above-mentioned techniques of detecting a motion of the subject allow optimum focus adjustment and exposure control for the subject.

However, the recent cameras are capable of continuous shooting at a speed as high as 10 or more frames per sec, so exposure calculation and focus adjustment of imaging lenses must be performed in a shorter period of time, resulting in an increase in probability that an exposure failure or a picture out-of-focus will occur.

Hence, Japanese Patent Laid-Open No. 2010-72283 captures image data of the first frame of shooting upon the same exposure calculation and focus alignment of an imaging lens as in single shooting, and captures image data of the second and subsequent frames upon detecting an area in which a specific subject is present from the image data of the first frame and configuring the storage time, exposure calculation range, and focus detection area in metering. In Japanese Patent Laid-Open No. 2010-72283, the inventor states that this operation achieves exposure calculation and focus adjustment in a short period of time, and allows stable exposure control and focus adjustment even during high-speed continuous shooting.

However, in Japanese Patent Laid-Open No. 2010-72283, since the metering range is configured based on the position information of the subject, the exposure calculation result may change even if the luminance of the subject remains unchanged when, for example, the relationship between the metering range and the subject position changes. Also, the technique described in this patent literature requires exposure calculation for each frame, and therefore makes processing cumbersome.

Japanese Patent Laid-Open No. 2003-255429 discloses an invention for preventing variations in exposure while omitting exposure calculation during continuous shooting. In Japanese Patent Laid-Open No. 2003-255429, the luminance values of the subject in the current and immediately previous frames are compared during continuous shooting. If the luminance of the subject remains unchanged, the control values of exposure in the immediately previous frame are continuously used in the current frame; otherwise, exposure calculation is performed. The method described in Japanese Patent Laid-Open No. 2003-255429 can omit exposure calculation if the luminance of the subject remains unchanged, and prevent variations in exposure because the exposure value remains unchanged.

However, if the luminance considerably changes in the background, for example, if an extremely dark or bright object enters the background, the metered value (the field of view luminance) also changes, so exposure calculation is performed even if the luminance of the main subject remains unchanged in the method described in Japanese Patent Laid-Open No. 2003-255429. Especially in photochronography, it is often the case that the brightness of the background considerably changes even if the luminance of the main subject remains unchanged, so this problem is non-negligible. Also, when exposure calculation is performed even if the luminance of the main subject remains unchanged, exposure changes due, for example, to a change in positional relationship between the main subject and the metering range, leading to the occurrence of variations in exposure during continuous shooting, as in the invention described in Japanese Patent Laid-Open No. 2010-72283.

SUMMARY OF THE INVENTION

The present invention has been made in consideration of the above-mentioned problems of the related art techniques, and provides an image capture apparatus capable of effectively suppressing variations in exposure and shortening the exposure calculation time during continuous shooting, and a method of controlling the same.

According to an aspect of the present invention, there is provided an image capture apparatus capable of continuous shooting, comprising: a configuring unit that configures a control value of exposure used to capture an image; a tracking unit that tracks a subject; and a determination unit that determines a degree of reliability of the tracking result obtained by the tracking unit, wherein the tracking unit tracks the subject during continuous shooting, and when the determination unit determines that the degree of reliability of the tracking result obtained by the tracking unit during the continuous shooting is high, the configuring unit configures a control value of exposure used to capture an image of the previous frame as a control value of exposure used to capture an image of the next frame.

According to another aspect of the present invention, there is provided a method of controlling an image capture apparatus capable of continuous shooting, comprising: a tracking step of tracking a subject during continuous shooting; a determination step of determining a degree of reliability of the tracking result obtained in the tracking step; and a configuring step of configuring a control value of exposure used to capture an image of the next frame during the continuous shooting, wherein when it is determined in the determination step that the degree of reliability of the tracking result obtained in the tracking step is high, in the configuring step a control value of exposure used to capture an image of the previous frame is configured as a control value of exposure used to capture an image of the next frame.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(Configuration of Camera 100)

An example of the configuration of a digital single-lens reflex camera (to be simply referred to as a camera hereinafter) 100 which exemplifies an image capture apparatus according to an embodiment of the present invention will be described first with reference to FIG. 1 which mainly shows a configuration in an optical system and FIG. 2 which shows a configuration associated with control.

The camera 100 includes a body 110 and imaging lens 105.

The imaging lens 105 forms an image of field of view light on a CCD 106 which exemplifies an image sensor. In this embodiment, the CCD 106 includes about 10,000,000 (3,888×2,592) effective pixels.

Figure 1:
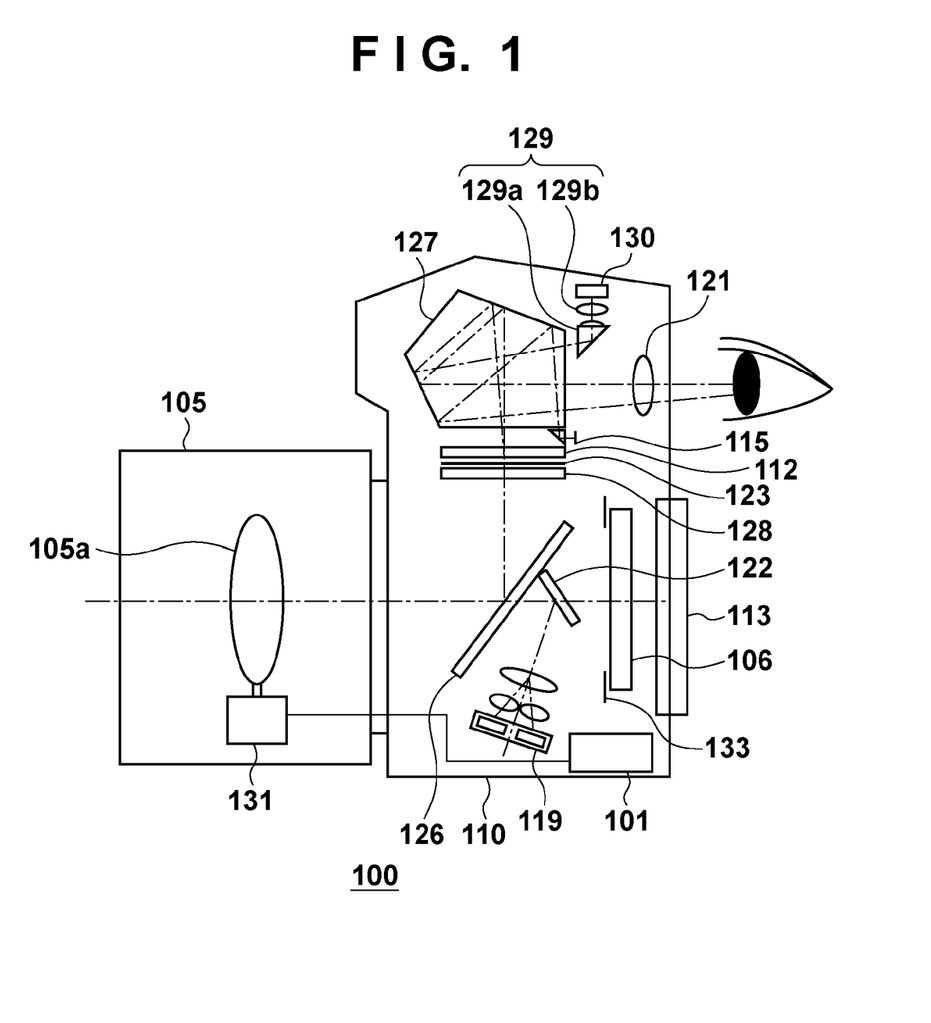
FIG. 1 is a view illustrating an example of the configuration of a digital single-lens reflex camera according to an embodiment of the present invention.
Figure 2:
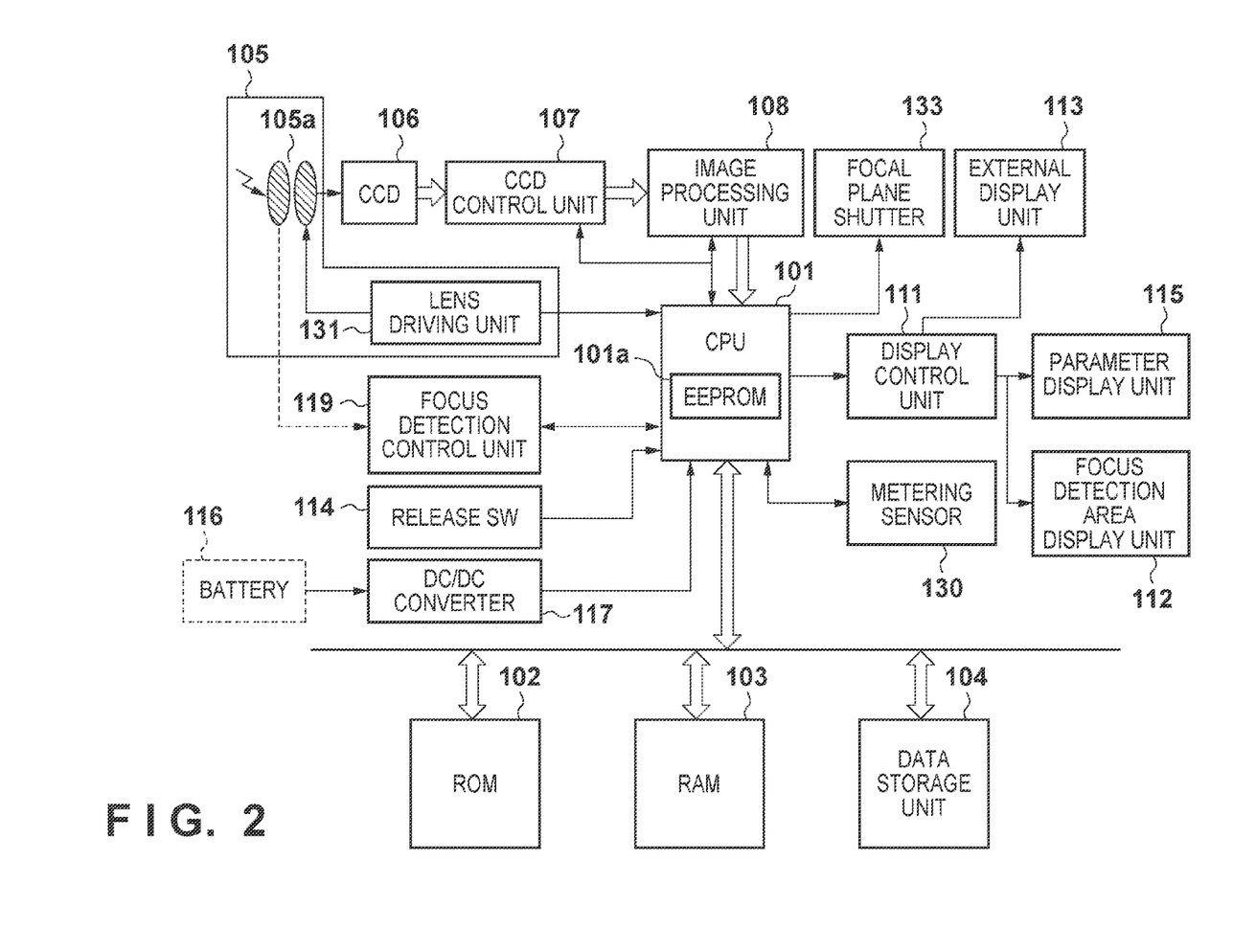
FIG. 2 is a block diagram illustrating an example of the configuration of the digital single-lens reflex camera according to the embodiment of the present invention.

Note that referring to FIG. 1, lenses included in the imaging lens 105 are represented as one lens 105a, for the sake of convenience. However, in practice, the imaging lens 105 includes a plurality of lenses including a focus lens, so focus position of the imaging lens 105 can be adjusted by moving the focus lens back and forth along the optical axis using a lens driving unit 131.

A focusing screen 128 is placed at a position equivalent to the imaging surface of the CCD 106 on the optical axis of light reflected by a main mirror 126. In a mirror-down state shown in FIG. 1, a field of view image is reflected by the main mirror 126 and formed on the focusing screen 128 again by primary imaging.

The user can observe through a pentaprism 127 and an eyepiece 121 the field of view image formed on the focusing screen 128. The focusing screen 128, pentaprism 127, and eyepiece 121 constitute a so-called TTL optical viewfinder.

Also, the peripheral portion of a light beam which bears the information of the subject is shielded by a viewfinder visual field frame 123 placed near the focusing screen 128, thereby allowing the user to visually recognize through the optical viewfinder the area captured by the CCD 106. A parameter display unit 115 allows the user to visually recognize various types of image capture information of the camera 100, such as the F-number and the shutter speed in the optical viewfinder through a lightguide prism, the pentaprism 127, and the eyepiece 121.

A focus detection area display unit 112 placed near the focusing screen 128 is formed by, for example, a polymer-dispersed liquid crystal (PN liquid crystal) panel, and allows the user to visually recognize, in the optical viewfinder, state display of the above-mentioned focus detection operation and display of the above-mentioned focus detection area, together with the field of view image.

The main mirror 126 is a half mirror. One component of a light beam transmitted through the main mirror 126 is guided to a focus detection control unit 119 through a sub-mirror 122. The focus detection control unit 119 includes a pair of line CCD sensors for focus detection, and calculates the phase difference (amount of defocus) between the outputs from the line CCD sensors. Also, the focus detection control unit 119 performs control of the storage time of each line CCD sensor and AGC (Auto Gain Control).

A CPU (Central Processing Unit) 101 calculates a focus position based on the amount of defocus detected by the focus detection control unit 119, and drives the focus lens through the lens driving unit 131 of the imaging lens 105. Upon this operation, the camera 100 according to this embodiment allows automatic focus detection (auto-focusing) of the phase-difference detection method.

The camera 100 in this embodiment has one-shot AF suitable for capturing an image of a still subject, and AI servo AF (continuous AF) suitable for capturing an image of a moving subject as automatic focus detection modes. In the one-shot AF, automatic focus detection is performed in a focus detection area which is arbitrarily selected by the user or automatically selected by the camera 100, the focus lens is moved to the focus position, and driving of the focus lens is stopped. On the other hand, in the AI servo AF, even after the focus lens is moved to the focus position, the focus detection area is widened (the number of focus detection areas used is increased) to detect a motion of the main subject. When a motion of the main subject is detected, driving of the focus lens is continuously executed in accordance with the amounts of defocus detected in other focus detection areas.

The user can normally select one-shot AF or AI servo AF. However, in this embodiment, AI servo AF is selected assuming a moving main subject. Also, in this specification, AI servo AF which uses the information of a subject tracking operation will be referred to as a first automatic focus detection operation, and conventional AI servo AF which does not use the information of a subject tracking operation will be referred to as a second automatic focus detection operation (to be described later).

A metering optical element (to be referred to as a metering lens hereinafter) 129 and a light-receiving element (to be referred to as a metering sensor hereinafter) 130 which form a metering optical system will be described. The metering lens 129 performs secondary imaging to form again on the metering sensor 130 the field of view image formed on the focusing screen 128. In this embodiment, the metering lens 129 is formed by two lenses 129a and 129b. The lens 129a changes the optical path of a light beam emerging from the pentaprism 127 to the upward direction, and the metering lens 129b performs secondary imaging to form the field of view image on the metering sensor 130 again.

The metering sensor 130 uses a CCD including, for example, 640 (horizontal)×480 (vertical) pixels arrayed at a pitch of about 6 μm, and color filters of three colors: R, G, and B are arranged on the pixels in the Bayer or stripe arrangement. An analog signal output from the metering sensor 130 is A/D-converted into, for example, an 8-bit digital signal by the CPU 101, and its color space is converted from the RGB format into the YUV format, thereby obtaining field of view luminance information and color information.

Figure 3:
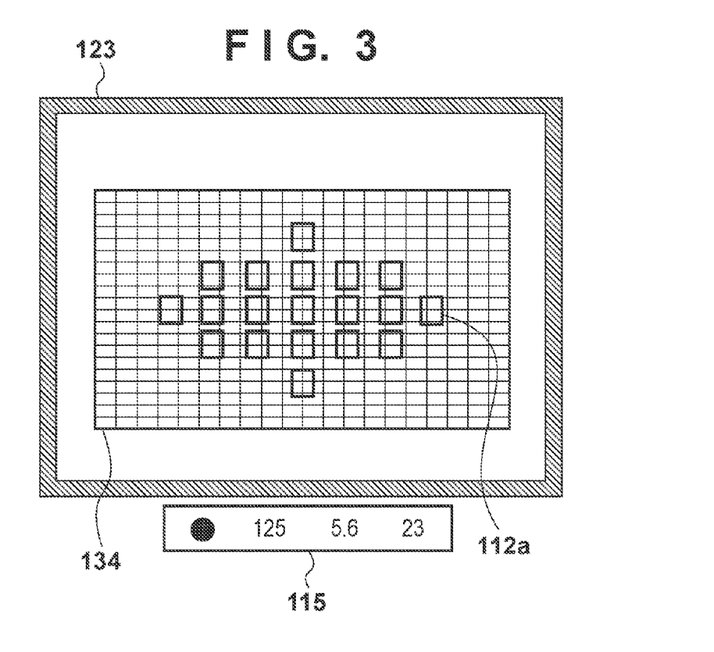
FIG. 3 is a view illustrating an example of the relationships among the visual field frame, the metering area, and the focus detection area in the embodiment of the present invention.

On the other hand, the metering lens 129 has an imaging magnification of, for example, 0.15×, and allows the metering sensor 130 to receive a light beam from a metering area 134 slightly inside the viewfinder visual field frame 123, as shown in FIG. 3. The metering sensor 130 divides the metering area 134 into 20 (horizontal)×20 (vertical) areas, and calculates a luminance value for each area from the values output from pixels (32×24 pixels) included in this area. The CPU 101 obtains the sum or average of the luminance values in the metering area 134 to correct the luminance value in accordance with the diffusion characteristics of the focusing screen 128 mounted in the camera 100. Also, the CPU 101 corrects an Fno. (execution Fno.) value representing the brightness of the imaging lens 105.

The CPU 101 calculates the amount of exposure by predetermined weighting calculation using a focus detection area (for example, a focus detection area 112a shown in FIG. 3) corresponding to the main subject as a center so that the main subject has appropriate exposure, based on the luminance value in each area within the metering area 134. The CPU 101 configures a control value for an aperture stop (not shown) in the imaging lens 105, a shutter speed control value for a focal plane shutter 133, and the image capture sensitivity (the value of a gain applied to a CCD output signal in a CCD control unit 107).

In this embodiment, as shown in FIG. 3, 19 focus detection areas are configured in the middle, upper, lower, right, and left portions of the image capture range, and the focus detection area display unit 112 displays their positions in accordance with the control of a display control unit 111. Note that when, for example, one of the 19 focus detection areas is selected, the display control unit 111 displays only a focus detection area (for example, the focus detection area 112a) selected on the focus detection area display unit 112, and does not display the remaining 18 focus detection areas. Upon this operation, the user visually recognizes only the selected focus detection area 112a.

Note that as in this embodiment, when there are a plurality of focus detection areas, one of them can be arbitrarily selected by the user, or automatically selected by the camera based on the detection result of the focus state in each of the plurality of focus detection areas.

The CPU 101 includes an EEPROM 101a as a nonvolatile memory. The CPU 101 expands a control program stored in a ROM (Read Only Memory) 102 into a RAM (Random Access Memory) 103, and executes this program, thereby controlling the operation of the camera 100 described in this embodiment.

The CPU 101 is connected to a data storage unit 104, an image processing unit 108, the display control unit 111, a release SW 114, a DC/DC converter 117 for supplying power from a battery 116, the metering sensor 130, and the focal plane shutter 133.

The battery 116 is a primary or secondary battery. Also, the DC/DC converter 117 is supplied with power from the battery 116 to perform boosting and regulation, thereby producing a plurality of power sources and supplying a power source that generates a required voltage to each block, including the CPU 101. The DC/DC converter 117 can control the start and stop of voltage supply to each unit in accordance with a control signal from the CPU 101.

For example, the CPU 101 loads captured image data output from the image processing unit 108, and transfers it to the RAM 103 or transfers display image data from the RAM 103 to the display control unit 111. Also, the CPU 101 encodes image data in, for example, the JPEG format, and records it in the data storage unit 104 as an image file or configures, for example, the image processing details and the number of pixels used for data reception in, for example, the CCD 106, CCD control unit 107, image processing unit 108, or display control unit 111. The CPU 101 controls the storage time and gain of the metering sensor 130 as well.

The CPU 101 issues an image capture operation instruction upon the operation of the release SW 114 as well.

The release SW 114 has its first step (half press) and second step (full press) that can be detected based on the amount of press. The first step of the release SW 114 will be referred to as SW1 hereinafter, and the second step of the release SW 114 will be referred to as SW2 hereinafter. When the user presses the release SW 114 to SW1, the CPU 101 recognizes this operation as input of an image capture preparation operation instruction, and starts a focus detection operation and an exposure control operation to perform focus adjustment of the imaging lens 105 and configure the control values of exposure of the imaging lens 105. When the release SW 114 is further pressed to SW2, the CPU 101 recognizes this operation as input of a final image capture instruction, and starts a final image capture (recording image capture) operation. The CPU 101 places the main mirror 126 face up so that a light beam from the imaging lens 105 reaches the CCD 106, and controls the F-number of the imaging lens 105 and the shutter speed of the focal plane shutter 133 in accordance with the configured control values of exposure to expose the CCD 106.

The CCD 106 photoelectrically converts a subject image formed by the imaging lens 105, and outputs an analog electrical signal. The CCD 106 is capable of output upon horizontally and vertically thinning the number of pixels in accordance with the resolution configured by the CPU 101. The CCD control unit 107 includes, for example, a timing generator for supplying a transfer clock signal and a shutter signal to the CCD 106, and a circuit for performing pixel thinning processing in accordance with the resolution configured by the CPU 101. After the end of exposure, the CCD control unit 107 reads out an analog electrical signal from the CCD 106, and performs noise elimination and gain processing for the analog electrical signal. Also, the CCD control unit 107 converts the analog electrical signal into a 10-bit digital signal (image data), and outputs it to the image processing unit 108.

The image processing unit 108 performs various types of image processing such as color interpolation processing, gamma conversion, color space conversion (from the RGB format into the YUV format), white balance processing, and electronic flash correction for the image data output from the CCD control unit 107, and outputs 8-bit image data in the YUV (4: 2: 2) format.

The CPU 101 transfers this image data to the RAM 103. The RAM 103 is used as a temporary buffer for temporarily storing image data transferred from the image processing unit 108 by the CPU 101 and JPEG image data read out from the data storage unit 104. The RAM 103 is also used as, for example, a work area for encoding and decoding image data, and those for various programs.

The CPU 101 encodes image data transferred to the RAM 103 in the JPEG format to generate an image file added with a header having predetermined information, and stores it in the data storage unit 104. The data storage unit 104 mounts a detachable recording medium such as a semiconductor memory card, and stores an image file on the recording medium.

On the other hand, the display control unit 111 converts (thins) image data transferred to the RAM 103 into that having a display resolution, converts its color space from the YUV format into the RGB format, and outputs it to an external display unit 113 such as a color liquid crystal display device.

In playing back an image file stored in the data storage unit 104, the CPU 101 decodes the image file, and the display control unit 111 performs the same processing for image data transferred to the RAM 103 and outputs the image data to the external display unit 113.

(Subject Tracking Operation)

A subject tracking operation by the camera 100 according to this embodiment will be described next. The camera 100 configures the area of the main subject (subject area) based on the output from the metering sensor 130 used in automatic exposure control, and searches for the destination to which the subject area has moved, thereby performing subject tracking.

In this manner, subject tracking is performed using the output from the metering sensor 130, so not the entire image capture range but the metering area 134 shown in FIG. 3 is the subject tracking range. Although the metering sensor 130 is used for each area including 32 (horizontal)×24 (vertical) pixels during metering, it is used for each pixel (for each of 640 (horizontal)×480 (vertical) pixels) so as to accurately recognize the subject in a subject tracking operation. This means that the metering sensor 130 is used as an image sensor including about 300,000 pixels. Also, since subject tracking is performed based on the correlations among a plurality of pixels captured by the metering sensor 130 at different times, the interval of image capture by the metering sensor 130 is configured short to a certain degree. For example, the metering sensor 130 obtains an image of one frame before the timing of calculation of control values of exposure used to capture each individual recording image during continuous shooting. However, the metering sensor 130 may continuously obtain image frames in the period from when the release SW 114 is pressed to SW1 until it is further pressed to SW2.

In subject tracking, first, the CPU 101 reads analog electrical signals from 640 (vertical)×480 (horizontal) pixels obtained from the metering sensor 130, and performs, for example, their A/D conversion, gamma conversion, and color conversion, thereby extracting luminance signals and color signals. The CPU 101 configures as a frame to be tracked 135 a partial area which has the selected focus detection area 112a as a center and includes, for example, 30 (horizontal)×30 (vertical) pixels in the metering area 134. The CPU 101 stores, in, for example, the RAM 103, luminance information based on the luminance signal from each pixel corresponding to the frame to be tracked 135, and color information based on the color signal from this pixel as an image pattern to search a subsequently captured image for a subject area.

The CPU 101 searches the image subsequently captured by the metering sensor 130 for a partial area (subject area) having maximum correlation values of the luminance information and the color information with the stored image pattern, and stores the correlation values and position information of the found subject area in the RAM 103. The main subject can be tracked from the frame to be tracked 135 and the position information of the found subject area. Also, it can be determined whether the main subject has moved, based on a change in position information of the found subject area (including the frame to be tracked 135).

In this embodiment, the frame to be tracked 135 is sequentially updated in the found partial area. Alternatively, the correlation values and position information of a partial area having maximum correlation values detected from a plurality of frames captured by the metering sensor 130 within the past predetermined period may be stored in, for example, the RAM 103 and used as auxiliary information when the degree of reliability of the tracking operation lowers.

Based on the position information of the main subject obtained by the subject tracking operation, a focus detection area to undergo focus adjustment is automatically selected from a plurality of focus detection areas, thereby precisely performing focus adjustment for the moved main subject. Similarly, the range in which the weight is relatively high in exposure calculation weighting keeps following the subject area, thereby calculating optimum exposure conditions for the moved main subject.

Calculation of the degree of reliability of the subject tracking result will be described next. In subject tracking of this embodiment, an operation of determining a new frame to be tracked by configuring as a subject area a partial area having maximum correlation values with that corresponding to the frame to be tracked 135 is repeated, as described earlier. The degree of reliability of the subject tracking result is determined based on a comparison between predetermined thresholds and the correlation values in the partial area detected as a subject area in such a subject tracking operation.

Figure 4:
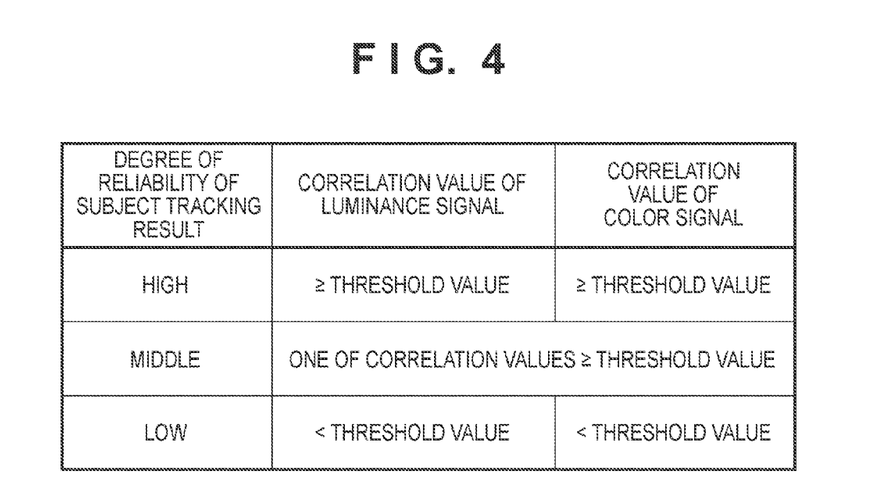
FIG. 4 is a table illustrating an example of the relationship between the degree of reliability of the subject tracking result and the combination of the correlation values of the luminance information and color information, which is determined based on whether these correlation values are equal to or larger than respective thresholds.

For example, it is possible to configure thresholds for the correlation values of the luminance information and color information, respectively, and determine the degree of reliability of the subject tracking result in accordance with whether the correlation values in the detected subject area are equal to or larger than the thresholds (whether this subject area has a high degree of reliability). FIG. 4 illustrates an example of the relationship between the degree of reliability of the subject tracking result and the combination of the correlation values of the luminance information and color information, which is determined based on whether these correlation values are equal to or larger than respective thresholds. That is, the degree of reliability of the subject tracking result is determined as "High" if the correlation values of both the luminance information and color information are equal to or larger than the thresholds, the degree of reliability of the subject tracking result is determined as "Low" if the correlation values of both the luminance information and color information are smaller than the thresholds, and the degree of reliability of the subject tracking result is determined as "Middle" if one of these correlation values is equal to or larger than the threshold. Although the degree of reliability is determined using three grades: "High", "Middle", and "Low" in the example shown in FIG. 4, it may be more finely graded and determined using two or more thresholds. Alternatively, "Middle" degree of reliability may be divided into that ("Middle 1") when only the correlation value of the luminance information is equal to or larger than the threshold, and that ("Middle 2") when only the correlation value of the color information is equal to or larger than the threshold. Note that in this embodiment, the method of calculating correlation values used in subject tracking is not limited to a specific method, and arbitrary correlation values can be used as indices for the degree of similarity between images.

In this embodiment, it is determined whether control values of exposure are to be calculated again and a focus detection area is selected, in accordance with the degree of reliability of the subject tracking result, as will be described later.

A subject tracking operation, an exposure control operation, and an operation of selecting a focus detection area will be described in more detail next with reference to FIGS. 5A to 8B.

Figure 5A:
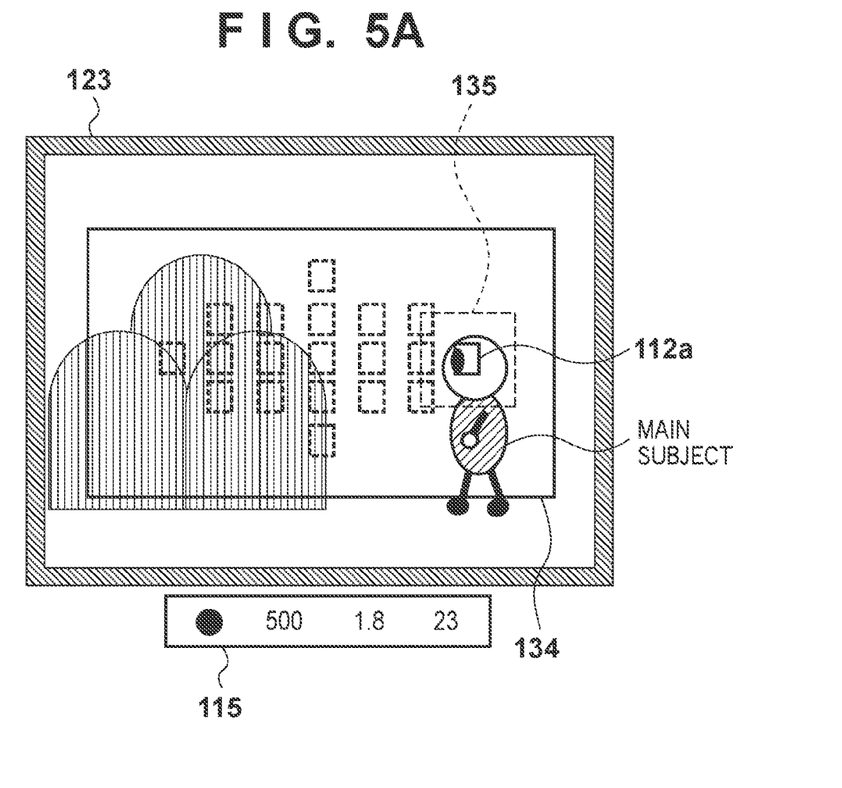
FIGS. 5A and 5B are views for explaining a subject tracking operation, an exposure control operation, and an operation of selecting a focus detection area in the embodiment of the present invention.
Figure 5B:
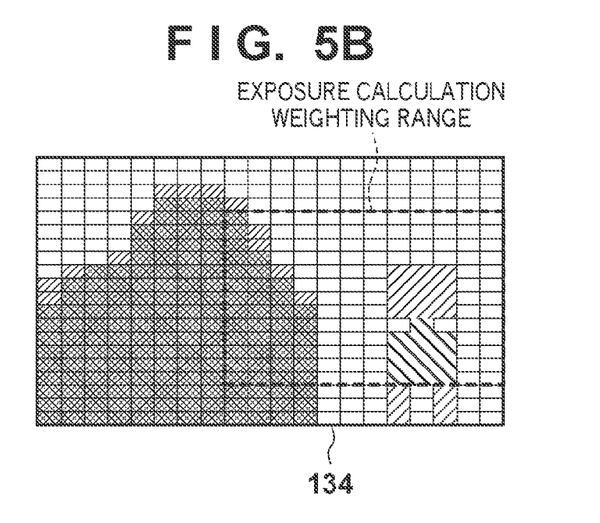

FIG. 5A schematically shows how the focus adjustment operation of the imaging lens 105 is performed for the main subject in the focus detection area 112a at the right end. Also, FIG. 5B schematically shows the luminance distribution when a luminance signal from the metering (or subject tracking) area 134 in FIG. 5A is divided into 20×20 areas. The CPU 101 determines the amount of exposure from the luminance information in the exposure calculation weighting range shown in FIG. 5B to determine corresponding control values of exposure (the F-number of the imaging lens 105, the shutter speed of the focal plane shutter 133, and the image capture sensitivity). The determined control values of exposure are displayed on the parameter display unit 115 through the display control unit 111 to allow the user to visually recognize them in the viewfinder.

Figure 6A:
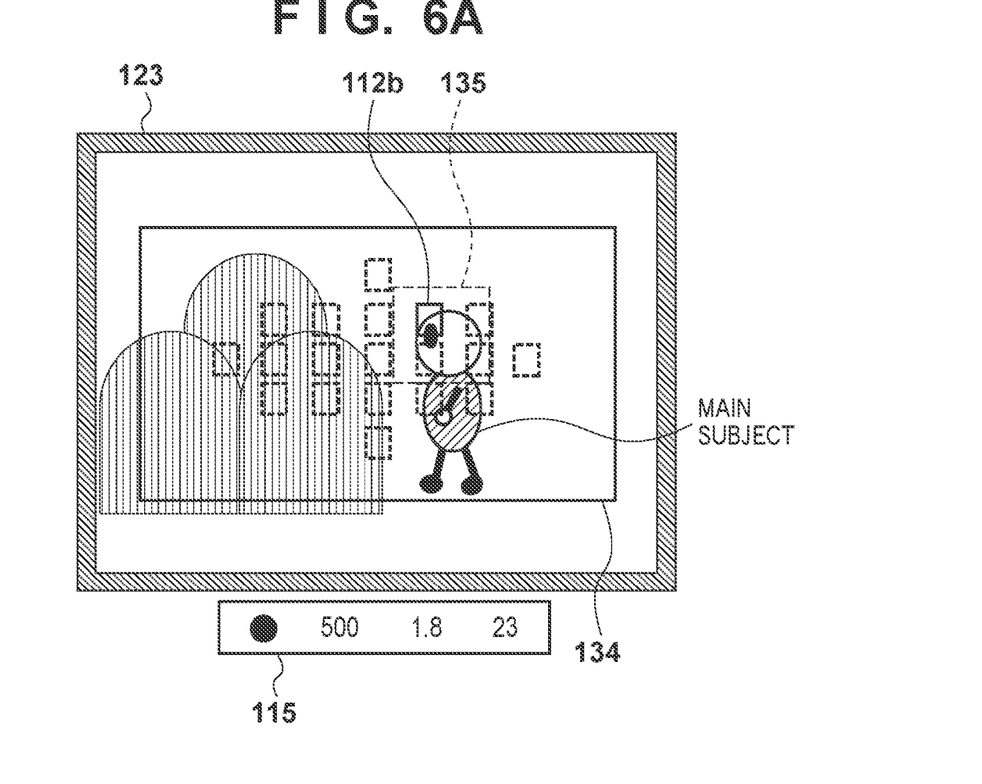
FIGS. 6A and 6B are views for explaining the subject tracking operation, the exposure control operation, and the operation of selecting a focus detection area in the embodiment of the present invention.
Figure 7A:
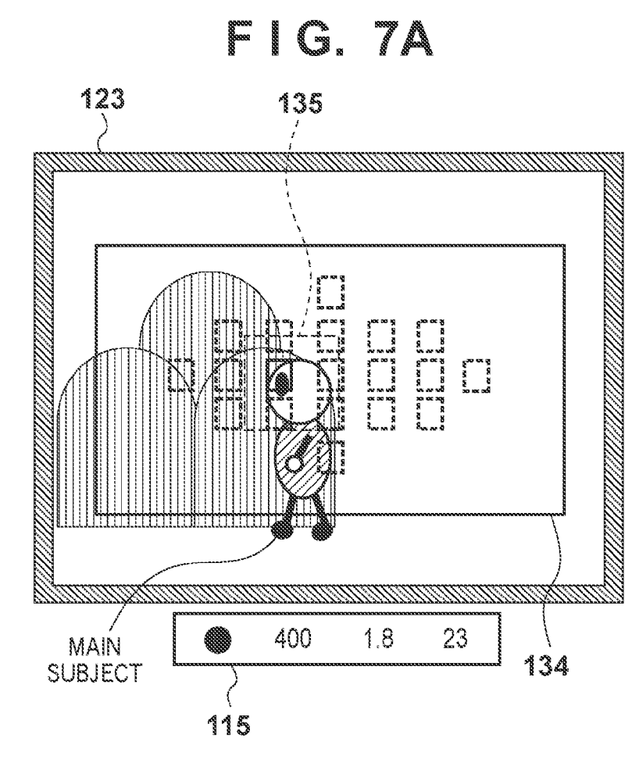
FIGS. 7A and 7B are views for explaining the subject tracking operation, the exposure control operation, and the operation of selecting a focus detection area in the embodiment of the present invention.
Figure 7B:
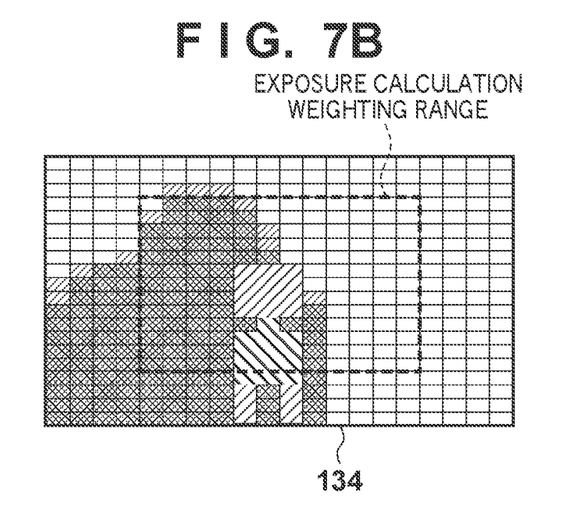
Figure 8A:
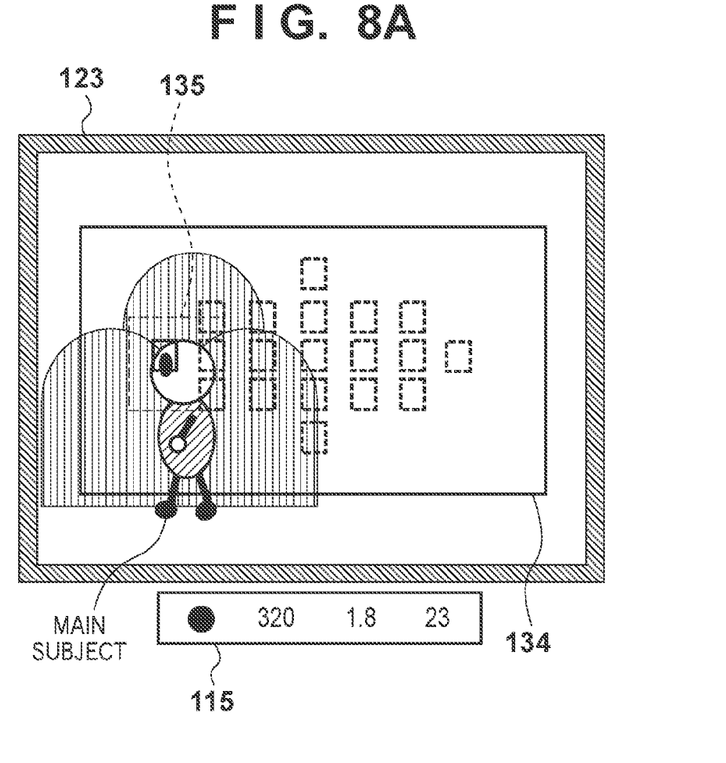
FIGS. 8A and 8B are views for explaining the subject tracking operation, the exposure control operation, and the operation of selecting a focus detection area in the embodiment of the present invention.
Figure 8B:
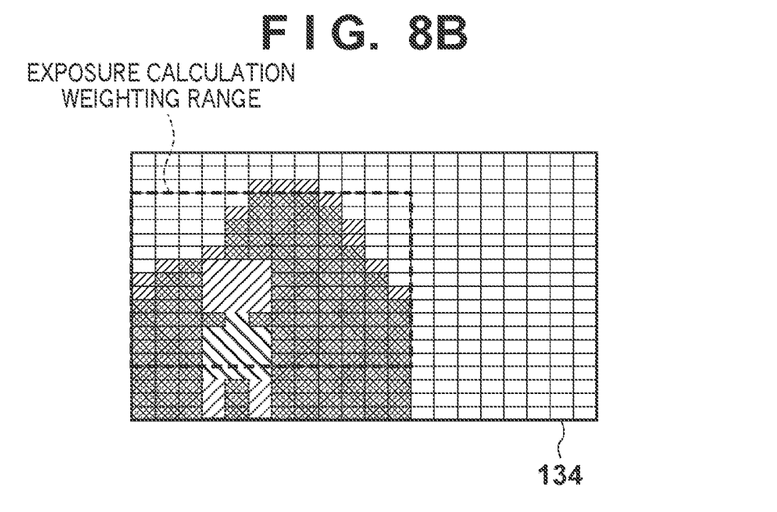

The CPU 101 configures as the frame to be tracked 135 a partial area which has a predetermined size (30 (horizontal)× 30 (vertical) pixels in this case) and the focus detection area 112a as a center (FIG. 5A). FIGS. 6A, 7A, and 8A show changes in focus detection area and frame to be tracked when the main subject moves to the left in the field of view from the state shown in FIG. 5A while the camera 100 stands still. Also, FIGS. 6B, 7B, and 8B show corresponding luminance distributions and exposure calculation weighting ranges.

When the main subject focused in FIG. 5A moves, as shown in FIG. 6A, the CPU 101 searches the image of the metering area 134 obtained by the metering sensor 130 for a partial area having maximum correlation values of the luminance information and color information in the frame to be tracked 135 shown in FIG. 5A. FIG. 6A assumes that the subject tracking result has a high degree of reliability. In this case, a focus detection area 112b in the subject area is selected as a focus detection area to be used in focus adjustment, and is displayed.

Figure 6B:
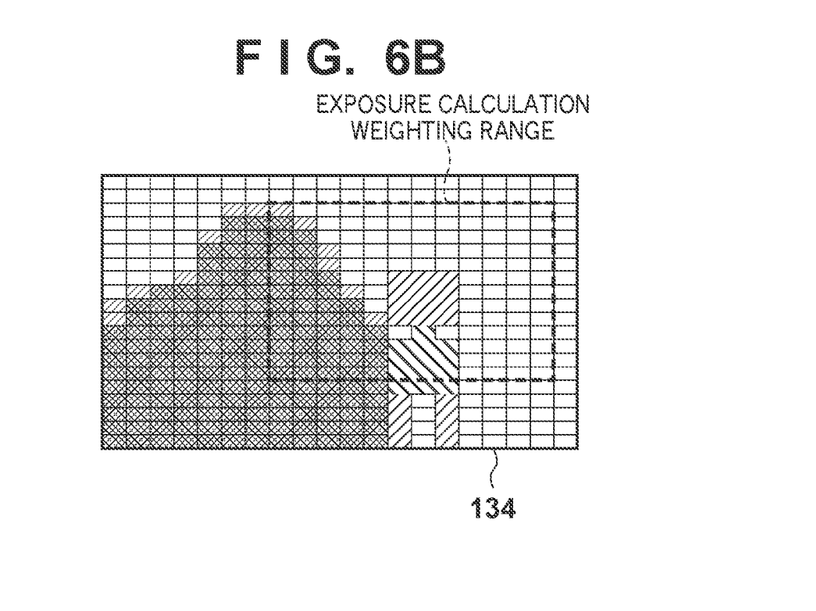

The CPU 101 also moves the exposure calculation weighting range to follow the changed focus detection area, and configures the detected subject area as a new frame to be tracked 135, as shown in FIG. 6B.

FIGS. 7A and 8A similarly assume that the subject tracking result has a high degree of reliability. However, as shown in FIGS. 7B and 8B, when a mountain (low-luminance portion) in the background falls within the exposure calculation weighting range in a large amount, the calculated field of view luminance decreases despite no change in luminance of the main subject. Conventionally, in such a case, the control values of exposure change so that the image obtained by capturing a scene shown in FIGS. 7A and 8A becomes brighter than that obtained by capturing especially a scene shown in FIG. 5A. In this embodiment, such a conventional problem is reduced or solved in the following way.

(Image Capture Operation)

An image capture operation by the camera 100 will be described with reference to FIGS. 9 and 10. Note that the camera 100 is standing by to capture an image upon power on. Also, the continuous shooting mode is configured so still images are continuously captured while the release SW 114 is kept pressed to SW2.

In step S201, the CPU 101 waits until the release SW 114 is pressed to SW1 (SW1 is turned on). If the release SW 114 is detected to be pressed to SW1, the CPU 101 performs automatic focus detection of the phase-difference detection method using the focus detection control unit 119 and lens driving unit 131 to drive the imaging lens 105 to a focus position in step S202.

In step S203, the CPU 101 calculates luminance information and color information from the image of the metering area 134 read out from the metering sensor 130, and stores these pieces of information in the RAM 103.

In step S204, the CPU 101, for example, processes the luminance information stored in step S203 for each area obtained by dividing the metering area 134 into 20×20 areas and weights the selected focus detection area 112a to calculate the field of view luminance in accordance with a predetermined algorithm, thereby determining the amount of exposure. The CPU 101 configures control values of exposure used to obtain the determined amount of exposure in accordance with, for example, a program diagram stored in advance. The control values of exposure include the F-number of the imaging lens 105, the shutter speed of the focal plane shutter 133, and the image capture sensitivity (the gain in the CCD control unit 107).

In step S205, the CPU 101 stores luminance information and color information, which correspond to (horizontal)×30 (lateral) pixels having the selected focus detection area as a center, among the luminance information and color information stored in step S203, separately in the RAM 103 as the luminance information and color information of the frame to be tracked 135.

In step S206, the CPU 101 determines whether the release SW 114 is pressed to SW2 (SW2 is turned on). If it is determined in step S206 that the release SW 114 is pressed to SW2, the CPU 101 executes an image capture operation based on the configured control values of exposure in step S207. When step S207 is executed for the first time, an image of the first frame in continuous shooting is captured.

In an image capture operation of step S207, first, the CPU 101 energizes the motor via a motor control unit (not shown) to place the main mirror 126 face up, and drives the aperture of the stop of the imaging lens 105 to a configured value via the lens driving unit 131. Then, the CPU 101 opens the front curtain of the focal plane shutter 133 to start exposure of the CCD 106 using a field of view image. After a predetermined shutter time, the CPU 101 closes the rear curtain of the focal plane shutter 133 to complete exposure of the CCD 106. The CPU 101 places the main mirror 126 face down and performs shutter charge, thereby completing the operation (image capture operation) of a series of shutter release sequences. Upon such an operation, charges corresponding to the field of view image are stored in each pixel of the CCD 106.

The charges stored in the CCD 106 by the image capture operation in step S207 are read into the CCD control unit 107 as electrical signals, are converted into image data through processing by the image processing unit 108, and are transferred to the RAM 103 by the CPU 101.

In step S208, the CPU 101 encodes image data which represents the field of view image captured by the CCD 106 and is transferred to the RAM 103 using the JPEG format, adds header information to the image data, and stores (records) the image data in the data storage unit 104 in the form of an image file.

After the image data is recorded in step S208, the CPU 101 determines in step S209 whether the release SW 114 is kept pressed to SW2 (whether continuous shooting continues). If the release SW 114 is not kept pressed to SW2, the CPU 101 returns the process to step S201; otherwise, it advances the process to step S211 (FIG. 10).

In step S211, the CPU 101 calculates luminance information and color information from the image of the metering area 134 read out from the metering sensor 130, and stores these pieces of information in the RAM 103, as in step S203. In step S212, the CPU 101 uses the luminance information and color information of the latest image stored in the RAM 103 in step S211, and the luminance information and color information in the frame to be tracked 135 stored in step S205 to search the latest image for a partial area having maximum correlation values of the luminance information and color information in the frame to be tracked.

In step S213, the CPU 101 stores in the RAM 103 the maximum correlation values and position information of the found partial area (subject area). Also, the CPU 101 compares the correlation values of the luminance information and color information calculated for each subject area with thresholds respectively configured in advance to determine the degree of reliability of the subject tracking result from the combination of the correlation values of the luminance information and color information, which is determined based on these correlation values are equal to or larger than the thresholds. In this case, the degree of reliability of the tracking result is determined using three grades: "High", "Middle", and "Low", as described with reference to FIG. 4.

In step S214, the CPU 101 determines whether the determined degree of reliability of the subject tracking result is not "Low". If the degree of reliability is "High" or "Middle", the CPU 101 advances the process to step S215; otherwise, the CPU 101 advances the process to step S223.

"High" and "Middle" degrees of reliability will be described first. In step S215, the CPU 101 compares the position information of the main subject obtained in step S213 with that of the previous frame (that of the tracking detection frame) to determine whether the main subject has moved. The CPU 101 determines that the main subject has moved if the position information has changed by a predetermined number of pixels or more, and selects a focus detection area corresponding to the position of the subject area detected in the current frame. Note that when a plurality of focus detection areas are included in the subject area at the destination to which the subject area has moved, the subject area may be divided and a focus detection area corresponding to an area having a highest correlation with an area corresponding to the tracking detection frame may be selected. Alternatively, if the main subject is the face of a person, a known face recognition technique may be used to select a focus detection area close to the eyes of the person.

If it is determined in step S215 that the main subject has not moved, the CPU 101 determines in step S217 whether the degree of reliability of the tracking result is "High". If it is determined in step S217 that the degree of reliability of the tracking result is "High", it can be determined that the main subject has not moved and the main subject luminance, in turn, remains unchanged. Hence, in this case, the CPU 101 determines that there is no need to execute autofocus detection and autoexposure control again. In step S220, the CPU 101 reads the control values of exposure of the previous frame stored in the RAM 103 in step S204, and configures these control values of exposure as those used to capture an image of the next frame. This makes it possible to omit the time taken to calculate control values of exposure.

On the other hand, if it is determined in step S217 that the degree of reliability of the subject tracking operation is "Middle", the correlation value of the luminance information or color information of the main subject is smaller than the threshold, so the luminance or color of the main subject has supposedly changed. Hence, in step S219, the CPU 101 calculates control values of exposure again, as in step S204.

Also, if it is determined in step S215 that the main subject has moved, the CPU 101 executes a first automatic focus detection operation in step S216. That is, the CPU 101 selects a focus detection area corresponding to a subject area obtained based on the subject tracking result, and executes automatic focus detection. In step S220, the CPU 101 reads the control values of exposure of the previous frame from the RAM 103, and configures these control values of exposure as those used to capture an image of the next frame, as described above.

In this manner, in this embodiment, if it is determined that the degree of reliability of the subject tracking result is "High", that is, the destination to which the main subject has moved is correctly detected, and the luminance of the main subject remains unchanged, the control values of exposure of the previous frame are continuously used to omit calculation of control values of exposure of the next frame. However, if it is determined that the degree of reliability of the subject tracking result is "Middle", that is, the luminance or color of the main subject has changed or the certainty of the position information of the detected subject area is slightly low, control values of exposure used to capture an image of the next frame are newly calculated.

Referring back to step S214, if it is determined that the degree of reliability of the subject tracking result is "Low", that is, the subject tracking result should not be used, the CPU 101 performs a second automatic focus detection operation (conventional AI servo AF) in step S223. This means that the CPU 101 performs a focus adjustment operation from signals from the selected focus detection area and other focus detection areas. In step S224, the CPU 101 calculates control values of exposure, as in step S204.

Figure 9:
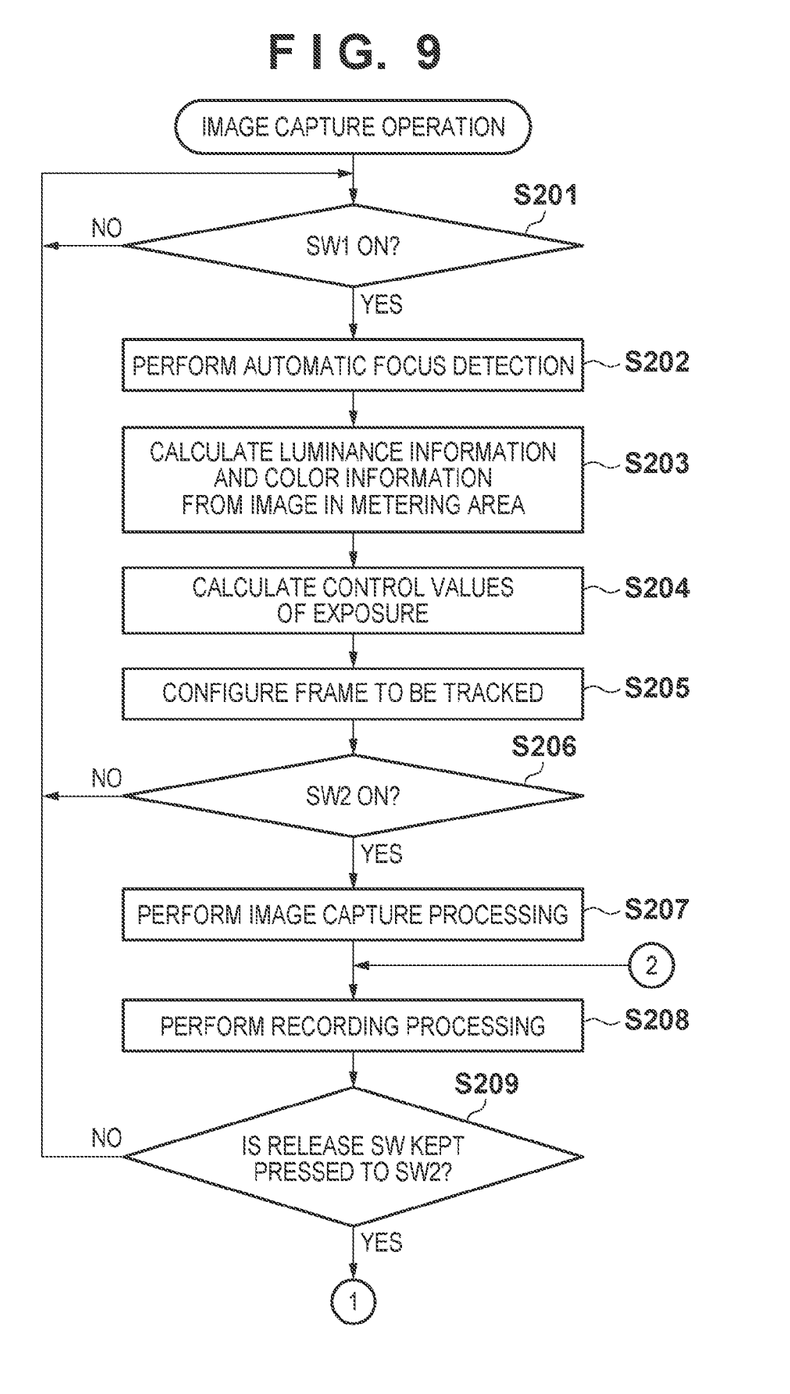
FIG. 9 is a flowchart for explaining the operation of the camera in the embodiment of the present invention.

When focus detection and configuration of control values of exposure corresponding to the degree of reliability of the subject tracking result are thus completed, the CPU 101 executes an operation of capturing an image of the next frame in step S221, and returns the process to step S208 (FIG. 9). The above-mentioned operation is then repeatedly performed while the release SW 114 is kept pressed to SW2 or until the number of images obtained by continuous shooting reaches an upper limit.

As described above, according to this embodiment, if it is determined that the luminance of the main subject remains unchanged upon continuous shooting in an image capture apparatus having a subject tracking function, the control values of exposure used to capture an image of the previous frame are used to capture an image of the next frame. Hence, it is possible not only to efficiently omit the time taken to calculate control values of exposure, but also to effectively suppress variations in exposure between images obtained by continuous shooting even if, for example, the luminance in the background of the main subject has changed during continuous shooting.

Also, upon subject tracking based on an image obtained by a metering sensor, an image sensor used to capture a recording image need not be used to capture an image for subject tracking. Also, since an image sensor used as a metering sensor includes pixels smaller in number than pixels of an image sensor used to capture a recording image, the amount of processing required for subject tracking can be kept small.

Note that when calculation of control values of exposure or focus detection processing can be omitted, the time saved upon the omission may be used to increase the image capture rate in continuous shooting or other types of processing.

Figure 10:
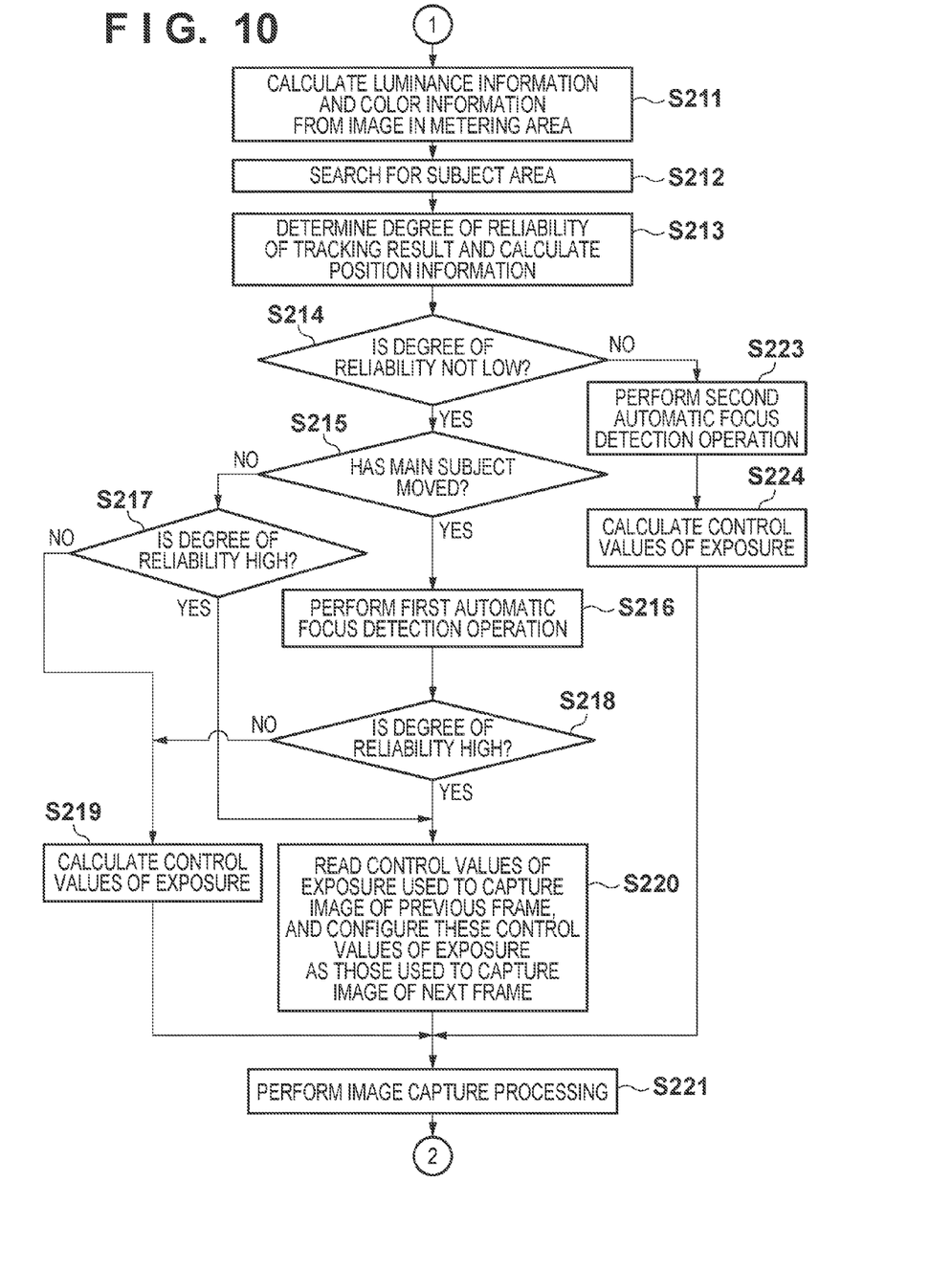
FIG. 10 is a flowchart for explaining the operation of the camera in the embodiment of the present invention.
Figure 11:
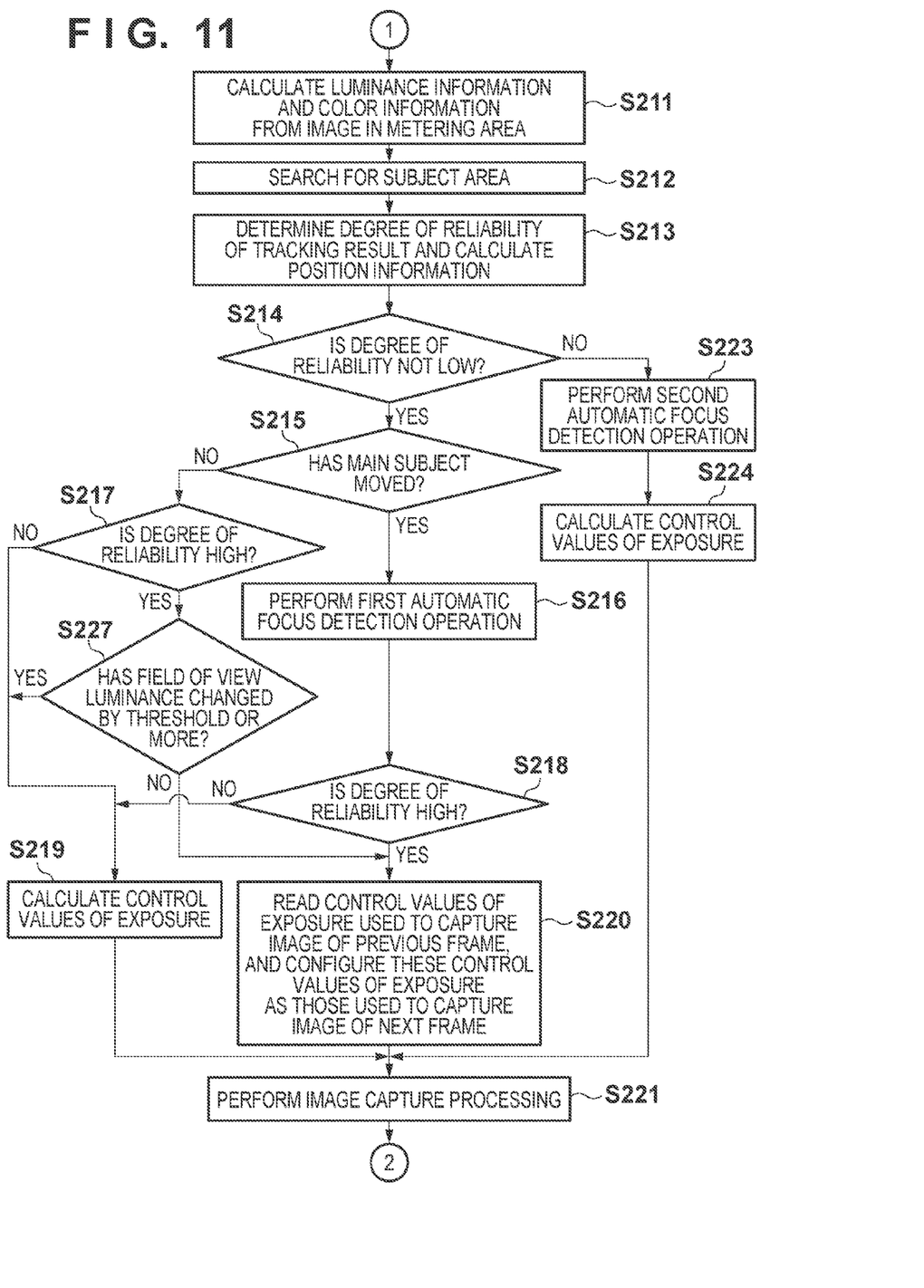
FIG. 11 illustrates a modification of the flowchart for explaining the operation of the camera in the embodiment of the present invention.

Also, although the control values of exposure of the previous frame are used as those of the current frame if the degree of reliability of the subject tracking result is high in FIG. 10 of the above-mentioned embodiment, exposure calculation may be performed again even if the degree of reliability of the subject tracking result is high. If the background is expected to cause highlight-detail loss or shadow-detail loss when, for example, the background luminance changes by a predetermined value or more (for example, three steps), it is often desirable to perform exposure calculation again. Hence, as shown in FIG. 11, if it is determined in step S217 that the degree of reliability of the tracking result is high, the process advances to step S227, in which it is determined whether the change in field of view luminance is equal to or larger than a threshold. More specifically, the CPU 101 compares the field of view luminance based on the luminance information stored in step S203 with the field of luminance based on the luminance information stored in step S211 to determine whether the change in luminance of the field of view is equal to or larger than a threshold. If it is determined in step S211 that the change in luminance of the field of view is equal to or larger than the threshold, the process advances to step S219, in which control values of exposure are calculated again. This makes it possible to preferentially prevent highlight-detail loss and shadow-detail loss in the background.

Figure 12A:
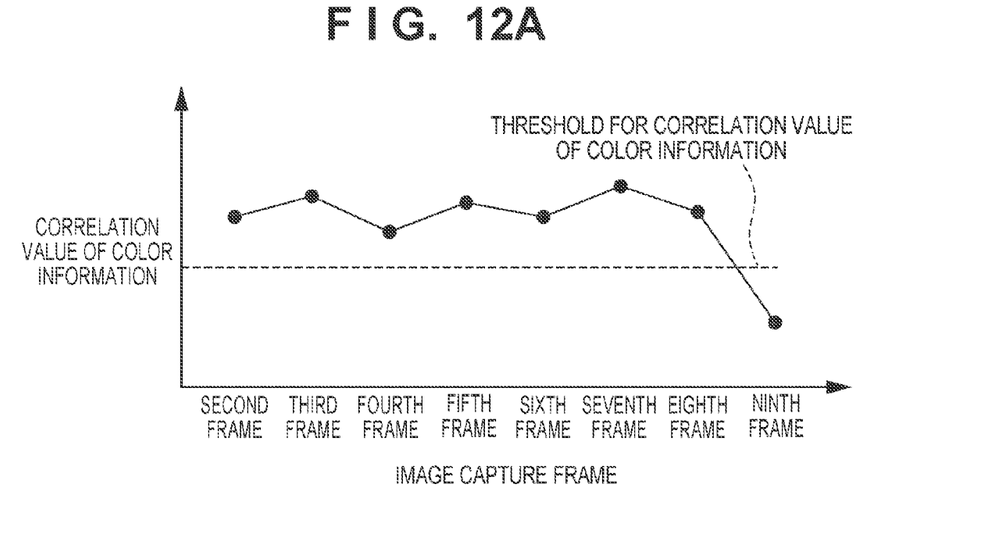
FIGS. 12A and 12B are graphs showing the correlation values between the initially configured frame to be tracked and the subject area in each image capture frame.
Figure 12B:
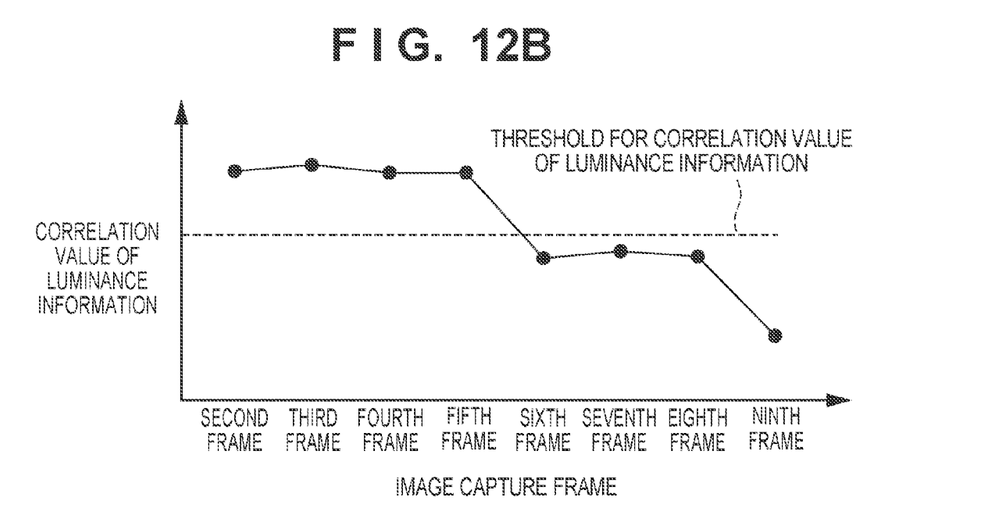

Also, the frame to be tracked, which is stored in step S205, may be updated after processing of capturing an image of the first frame. FIGS. 12A and 12B show the correlation values between the frame to be tracked, which is configured before processing of capturing an image of the first frame, and the subject area in each image capture frame, in which FIG. 12A shows the correlation value of the color information, and FIG. 12B shows the correlation value of the luminance information. In continuous shooting in which the correlation values change, as shown in, for example, FIGS. 12A and 12B, a frame having high correlation values of both a luminance signal and color signal, as in the second to fifth frames, that is, a frame that exhibits a subject tracking result with a high degree of reliability is controlled using the same control values of exposure as the first frame.

In the fifth and sixth frames, the color information does not considerably change but the luminance signal considerably changes, so the subject may have moved from a sunny place into a shadowy place.

As a result, in the sixth and subsequent frames, it is desired to calculate control values of exposure for each frame again, in consideration of the correlation values with the frame to be tracked configured before processing of capturing an image of the first frame. Hence, as in the fifth and sixth frames, if at least one of the correlation values of the color information and luminance information becomes lower than a given threshold, the subject area at that time is reconfigured as a frame to be tracked. Upon this operation, correlation values with the frame to be tracked reconfigured in the sixth frame are calculated in the seventh and eighth frames, thereby directly continuing to use the control values of exposure which have a high correlation and are calculated in the sixth frame. In this manner, the chance of omitting calculation of control values of exposure can be increased by reconfiguring the frame to be tracked when, for example, the frame to be tracked is configured in the beginning during continuous shooting and the scene in the field of view changes.

Note that the frame to be tracked may be reconfigured the moment the correlation values decrease, as in the fifth and sixth frames, or may be reconfigured when two frames with low correlation values are continuously captured. Also, the above-mentioned frame to be tracked may be reconfigured when the degree of reliability of the subject tracking result becomes "Middle" or "Low".

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-119711, filed on May 27, 2011, which is hereby incorporated by reference herein in its entirety.

What is claimed is:

1. An image capture apparatus capable of continuous shooting, comprising:
    a configuring unit that configures a control value of exposure used to capture an image;
    a tracking unit that tracks a subject; and
    a determination unit that determines a degree of reliability of the tracking result obtained by said tracking unit,
    wherein said tracking unit tracks the subject during continuous shooting, and
    when said determination unit determines that the degree of reliability of the tracking result obtained by said tracking unit during the continuous shooting is high, said configuring unit configures a control value of exposure used to capture an image of the previous frame as a control value of exposure used to capture an image of the next frame.

2. The apparatus according to claim 1, wherein when it is determined that one of a luminance and a color of the subject remains unchanged, said determination unit determines that the degree of reliability of the tracking result is high.

3. The apparatus according to claim 1, wherein
    said tracking unit tracks the subject by searching the captured image for an area having a high correlation of luminance information and color information with an image pattern, and
    when a correlation value of the luminance information in the found area is not less than a threshold value of a correlation value of predetermined luminance information, and a correlation value of the color information in the found area is not less than a threshold of a correlation value of predetermined color information, said determination unit determines that the degree of reliability of the tracking result obtained by said tracking unit is high.

4. The apparatus according to claim 1, further comprises a metering sensor,
   wherein said tracking unit performs the tracking using an image captured by said metering sensor.

5. The apparatus according to claim 4, wherein when said determination unit does not determine that the degree of reliability of the tracking result obtained by said tracking unit during the continuous shooting is high, said configuring unit calculates a required amount of exposure based on the image captured by said metering sensor, and configures a control value of exposure used to obtain the amount of exposure as a control value of exposure used to capture an image of the next frame.

6. A method of controlling an image capture apparatus capable of continuous shooting, comprising:
   a tracking step of tracking a subject during continuous shooting;
   a determination step of determining a degree of reliability of the tracking result obtained in the tracking step; and
   a configuring step of configuring a control value of exposure used to capture an image of the next frame during the continuous shooting,
   wherein when it is determined in the determination step that the degree of reliability of the tracking result obtained in the tracking step is high, in the configuring step a control value of exposure used to capture an image of the previous frame is configured as a control value of exposure used to capture an image of the next frame.

\* \* \* \* \*